US012643064B2

(12) United States Patent
Kang et al.

(10) Patent No.: US 12,643,064 B2
(45) Date of Patent: Jun. 2, 2026

(54) APPARATUS FOR COLLECTING POWDER IN EXHAUST GAS WITH AN INCREASED COLLECTION CAPACITY AND EXHAUST GAS TREATMENT EQUIPMENT PROVIDED WITH SAME

(71) Applicant: CSK INC., Yongin-si (KR)

(72) Inventors: MyeongHoon Kang, Yongin-si (KR); JinHong Kim, Yongin-si (KR)

(73) Assignee: CSK Inc., Gyeonggi-do (TW)

( * ) Notice: Subject to any disclaimer, the term of this patent is extended or adjusted under 35 U.S.C. 154(b) by 728 days.

(21) Appl. No.: 18/246,438

(22) PCT Filed: Sep. 21, 2021

(86) PCT No.: PCT/IB2021/058593
§ 371 (c)(1),
(2) Date: Mar. 23, 2023

(87) PCT Pub. No.: WO2022/064360
PCT Pub. Date: Mar. 31, 2022

(65) Prior Publication Data
US 2023/0356126 A1     Nov. 9, 2023

(30) Foreign Application Priority Data

Sep. 24, 2020     (KR) ........................ 10-2020-0123452

(51) Int. Cl.
*B01D 46/00*          (2022.01)
*B01D 46/24*          (2006.01)
(Continued)

(52) U.S. Cl.
CPC ......... *B01D 46/0002* (2013.01); *B01D 46/24* (2013.01); *B01D 46/681* (2022.01); *B01D 53/81* (2013.01); *B01D 2258/0216* (2013.01)

(58) Field of Classification Search
None
See application file for complete search history.

(56) References Cited

U.S. PATENT DOCUMENTS

| | | |
|---|---|---|
| 4,557,738 A | 12/1985 | Menasian |
| 4,565,555 A | 1/1986 | Menasian |
| | (Continued) | |

FOREIGN PATENT DOCUMENTS

| | | |
|---|---|---|
| CN | 102421509 A | 4/2012 |
| CN | 103752107 A | 4/2014 |
| | (Continued) | |

OTHER PUBLICATIONS

European Communication dated Sep. 18, 2024, Supplementary Search Report dated Sep. 6, 2024, Communication dated Jul. 17, 2024 and Supplementary Partial Search Report dated Jul. 8, 2024 for corresponding European application Serial No. EP21871779, 21 pages.

(Continued)

*Primary Examiner* — Natasha E Young
(74) *Attorney, Agent, or Firm* — Theodore M. Magee; Westman, Champlin & Koehler, P.A.

(57)                    ABSTRACT

An apparatus includes a filter body, which filters an exhaust gas and feeds it to an adsorption reaction device and is disposed below the adsorption reaction device; and a housing which provides an internal space for storing powder separated from the filter body and is installed below the adsorption reaction device, which housing includes a filter installation unit, which is a space projected below the adsorption reaction device and which provides a filter installation space internally for installing the filter body and an expansion unit that protrudes sideways from the filter installation unit and provides an expansion space which communicates internally with the filter installation space, and the internal space is expanded by the expansion space to (Continued)

increase the powder collection capacity. A suction port for sucking in the exhaust gas is installed in the expansion unit.

17 Claims, 7 Drawing Sheets

(51) Int. Cl.
  B01D 46/681        (2022.01)
  B01D 53/81          (2006.01)

(56)                    References Cited

U.S. PATENT DOCUMENTS

| | | | |
|---|---|---|---|
| 5,045,098 A | 9/1991 | Poor | |
| 5,342,433 A | 8/1994 | Avondoglio | |
| 5,698,012 A * | 12/1997 | Yoshikawa | F01N 3/0842 |
| | | | 60/275 |
| 2009/0044501 A1* | 2/2009 | Choi | A47L 9/122 |
| | | | 55/337 |
| 2019/0160410 A1* | 5/2019 | Horner | B01D 46/0036 |

FOREIGN PATENT DOCUMENTS

| | | | |
|---|---|---|---|
| CN | 208320274 U | 1/2019 | |
| CN | 110420511 A | 11/2019 | |
| DE | 202010009971 U1 | 10/2010 | |
| JP | 2005313041 A | 11/2005 | |
| JP | 2007125294 A | 5/2007 | |
| JP | 2011163273 A | 8/2011 | |
| JP | 2018051472 A | 9/2016 | |
| JP | 2017186974 A | 10/2017 | |
| JP | 2019058841 A | 4/2019 | |
| KR | 20030063786 A | 7/2003 | |
| KR | 20090080228 A | 7/2009 | |
| KR | 20110060385 A | 6/2011 | |
| KR | 20140136814 A | 12/2014 | |
| KR | 101661314 B1 | 9/2016 | |
| KR | 101806170 B1 | 12/2017 | |
| KR | 20190003139 U | 12/2019 | |
| KR | 102190214 B1 | 12/2020 | |
| KR | 102208983 B1 | 1/2021 | |
| TW | I226259 B | 1/2005 | |
| TW | M36775 | 11/2009 | |
| WO | 2020144595 A1 | 7/2020 | |
| WO | 2022064361 A1 | 3/2022 | |

OTHER PUBLICATIONS

Taiwanese Search Report dated Jan. 19, 2025 and Office Action dated Feb. 4, 2025 for corresponding Taiwanese application Serial No. 110135515, 8 pages.
Taiwanese Search Report dated Jan. 18, 2025 and Office Action dated Mar. 10, 2025 for corresponding Taiwanese application Serial No. 110135615, 8 pages.
PCT International Search Report dated Dec. 20, 2021 for corresponding PCT application Serial No. PCT/IB2021/058595, 4 pages.
PCT International Written Opinion dated Dec. 20, 2021 for corresponding PCT application Serial No. PCT/IB2021/058595, 5 pages.
British Search Report dated Oct. 26, 2021 for corresponding British application Serial No. GB20105811.0, 1 page.
British Search Report dated May 11, 2022 for corresponding British application Serial No. GB2105811.0, 1 page.
Korean Written Decision on Registration dated Jan. 21, 2021 for corresponding Korean application Serial No. 10-2020-0123451, 4 pages.
British Search Report dated Oct. 25, 2021 for corresponding British application Serial No. GB2105810.2, 1 page.
PCT Notification of Transmittal of the International Search Report and the Written Opinion of the International Searching Authority, or the Declaration, PCT Search Report and PCT Written Opinion dated Dec. 21, 2021 for corresponding PCT application Serial No. PCT/IB2021/058593, 11 pages.

* cited by examiner

APPARATUS FOR COLLECTING POWDER IN EXHAUST GAS WITH AN INCREASED COLLECTION CAPACITY AND EXHAUST GAS TREATMENT EQUIPMENT PROVIDED WITH SAME

CROSS-REFERENCE OF RELATED APPLICATION

This application is a Section 371 National Stage Application of International Application No. PCT/IB2021/058593, filed Sep. 21, 2021, and published as WO 2022/064360 A1 on Mar. 31, 2022, the content of which is hereby incorporated by reference in its entirety and which claims priority of Korean Application No. 10-2020-0123452, filed Sep. 24, 2020.

FIELD

The present invention relates to technology for treating exhaust gas in a semiconductor manufacturing process and, more particularly, to an apparatus for collecting powder contained in exhaust gas.

BACKGROUND

Semiconductor devices are manufactured by repeatedly performing processes such as photolithography, etching, diffusion, and metal deposition on a wafer in a process chamber. Various process gases are used during such semiconductor manufacturing process, and residual gas is present in the process chamber after the process is completed. Since the residual gas in the process chamber contains toxic components, it is discharged by a vacuum pump and purified by an exhaust gas treatment apparatus such as a scrubber. Powder is present in the exhaust gas, but the powder in the exhaust gas is either a by-product generated in the process chamber or is formed when some components contained in the exhaust gas are solidified due to changes in temperature and pressure in the process of residual gases from the process chamber being discharged through the exhaust line. Since powder in exhaust gas can accumulate in an exhaust line and block the flow path, it is collected through a apparatus for collecting powder that is installed on the exhaust line.

A apparatus for collecting powder typically consists of a filter and a housing that accommodates the filter, and the powder that does not pass through the filter accumulates in the internal space of the housing and is collected. As the powder collection capacity increases, it is advantageous for improving process efficiency. The powder collection capacity depends on the size of the internal space of the housing, and, thus, it is necessary to effectively increase the size of the housing.

The discussion above is merely provided for general background information and is not intended to be used as an aid in determining the scope of the claimed subject matter. The claimed subject matter is not limited to implementations that solve any or all disadvantages noted in the background.

SUMMARY

The purpose of the present invention is to provide an apparatus for collecting powder in exhaust gas with an increased collection capacity and exhaust gas treatment equipment provided with same.

In order to achieve the purpose of the present invention, according to one aspect of the present invention, provided is an apparatus for collecting powder in exhaust gas, comprising an adsorption reaction device for treating exhaust gas using an adsorption reaction, wherein the apparatus for collecting powder in exhaust gas comprises a filter body, which includes a filter member which filters the exhaust gas and feeds it to an adsorption reaction device and is disposed below the adsorption reaction device; and a housing which provides an internal space for storing powder separated from the filter member and is installed below the adsorption reaction device; and a housing which provides an internal space for storing powder separated from the filter member and is installed below the adsorption reaction device and which provides a filter installation space internally for installing the filter body, and an expansion unit which is formed so as to protrude sideways from the filter installation unit and provides an expansion space which communicates internally with the filter installation space, and the internal space is expanded by the expansion space so as to increase the powder collection capacity, and a suction port for sucking in the exhaust gas is installed in the expansion unit.

The aforementioned objects of the present invention can all be achieved by means of the present invention. Specifically, an expansion unit, which expands sideways in the housing where powder is collected, can increase the collection capacity of powder and, thus increase the lifespan of the exhaust gas treatment equipment.

In addition, the route by which exhaust gas flows in the internal space of the housing increases due to the expanded space within the housing thus increases the quantity of powder falling due to gravity, allowing the lifespan of filters to be extended.

Two gas supply ports are also provided, one on either side, thus allowing selection according to direction from which gas is fed, thereby reducing the length of the gas supply segment.

The Summary is provided to introduce a selection of concepts in a simplified form that are further described in the Detailed Description. This summary is not intended to identify key features or essential features of the claimed subject matter, nor is it intended to be used as an aid in determining the scope of the claimed subject matter.

DETAILED DESCRIPTION

Hereinafter, the configuration and operation of an embodiment of the present invention will be described in detail with reference to the drawings.

Figure 1:
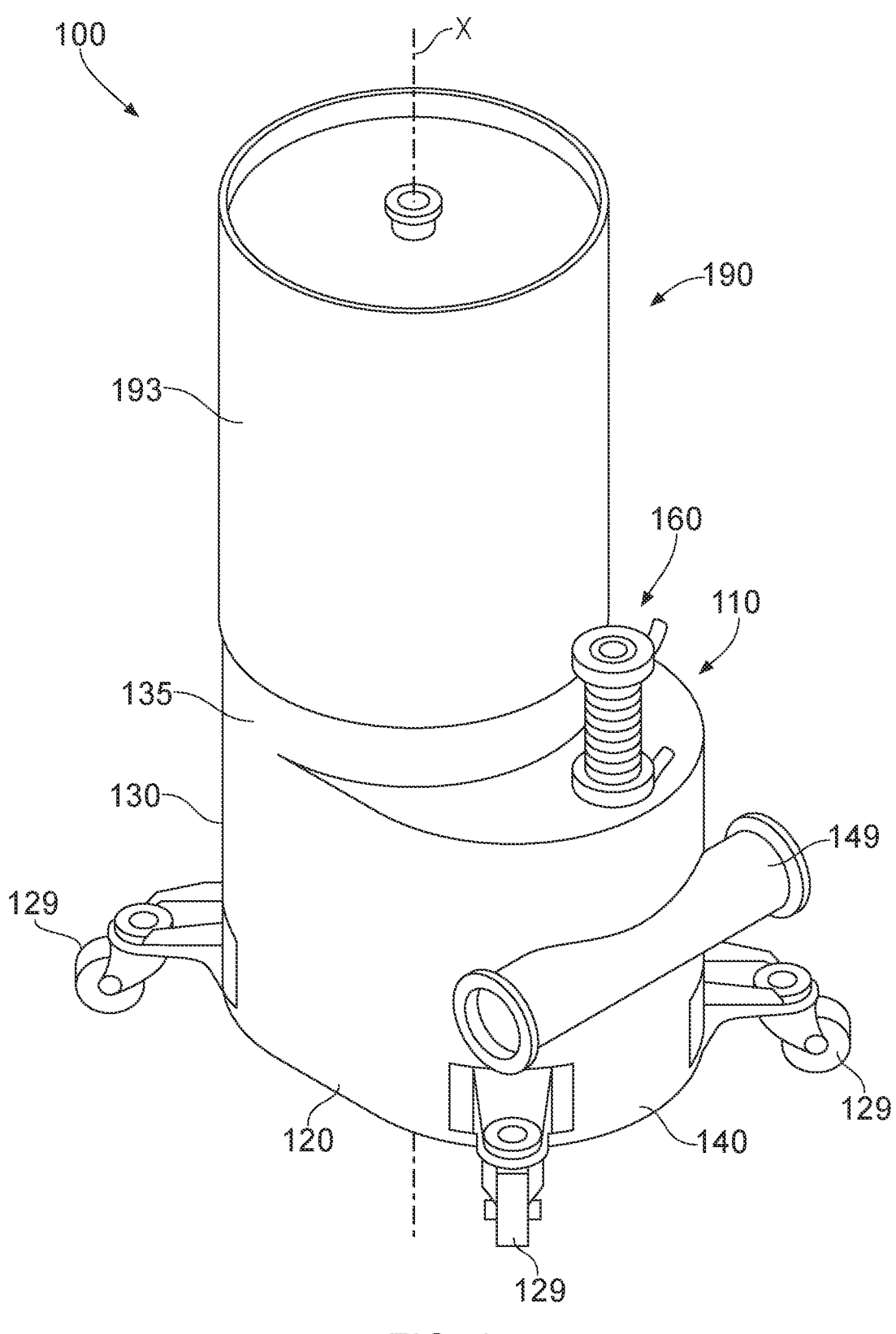
FIG. 1 depicts a perspective view of an exhaust gas treatment apparatus provided with an apparatus for collecting powder according to one embodiment of the present invention.
Figure 2:
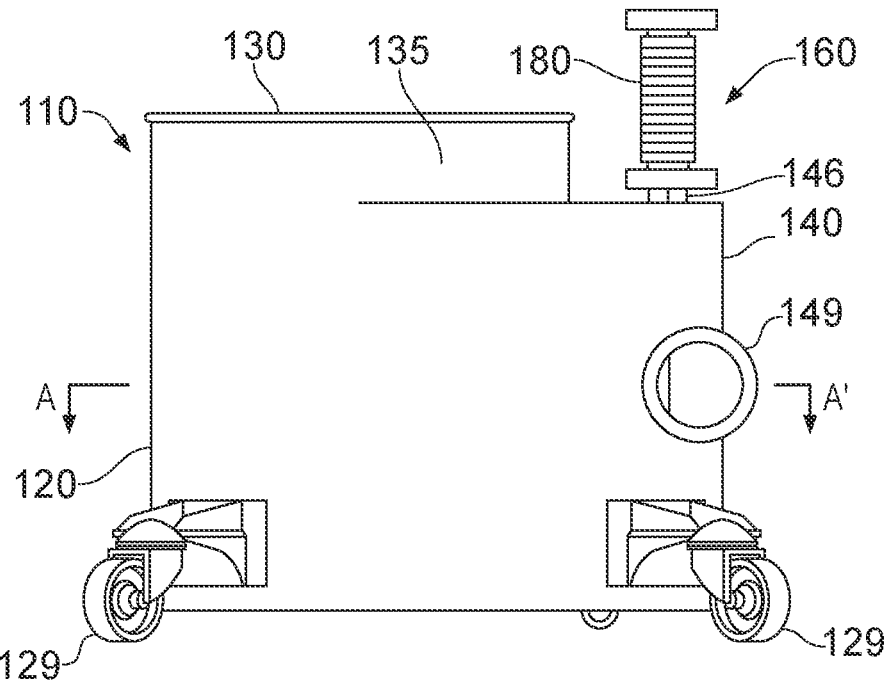
FIG. 2 depicts a lateral view of the apparatus for collecting powder depicted in FIG. 1.
Figure 3:
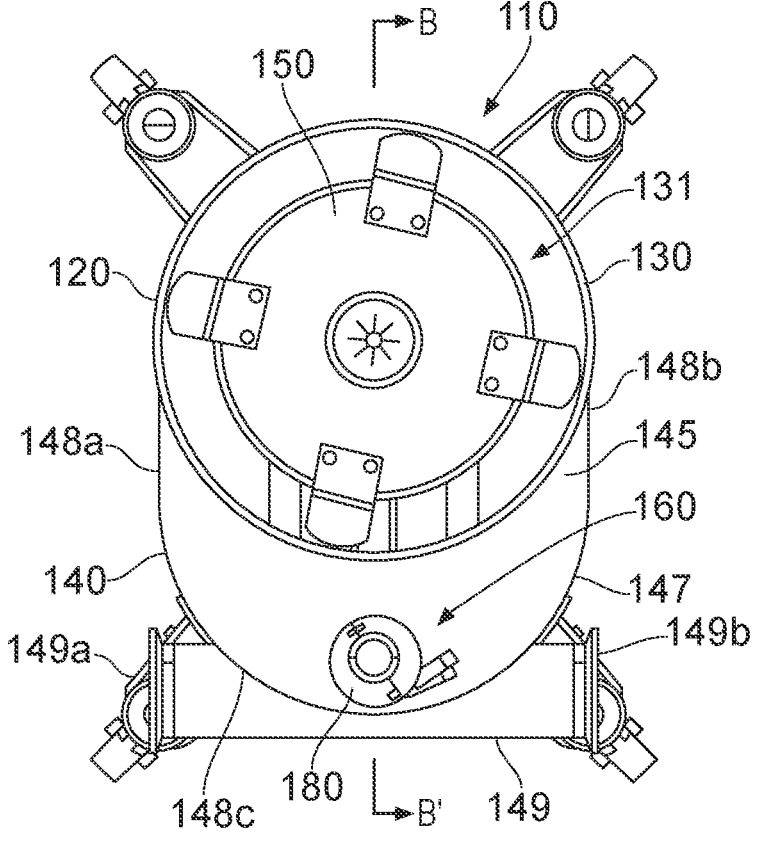
FIG. 3 depicts a plan view of the apparatus for collecting powder depicted in FIG. 1.

FIG. 1 depicts a perspective view of an exhaust gas treatment equipment according to one embodiment of the present invention. Referring to FIG. 1, an exhaust gas treatment equipment (100) according to one embodiment of the present invention comprises a apparatus for collecting powder (110) for collecting powder in exhaust gas using a filter as a type of dry scrubber, and an adsorption reaction device (190) for treating exhaust gas discharged from the apparatus for collecting powder (110) using an adsorption reaction.

The apparatus for collecting powder (110) filters exhaust gas through a filter and collects powder contained in the exhaust gas. Exhaust gas discharged from the apparatus for collecting powder (110) is fed to an adsorption reaction apparatus (190).

With reference to FIG. 1 to FIG. 6, the apparatus for collecting powder (110) comprises a housing (120), a filter module (150) installed so as to be located inside the housing (120), and a striking module (160) installed in the housing (120).

The housing (120) includes a filter installation unit (130) and housing (140) which is formed expanding from the filter installation unit (130). The internal space of the housing (120) forms a powder storage space where collected powder is stored.

The filter installation unit (130) is generally cylindrical and provides an upright cylindrical filter installation space (131) inside of which a filter module (150) is disposed. The central axis (X) of the cylindrical filter installation space (131) extends along a vertical direction. The filter installation unit (130) includes a base floor plate (132) and a base side wall (135) extending upward from the base floor plate (132). The base floor plate (132) is generally a flat circle disposed horizontally, and the top surface of the base floor plate (132) forms the floor of the filter installation space (131). The filter module (150) is placed at the centre of the base floor plate (132) in the filter installation space (131). The base side wall (135) extends upward from the edge of the base floor plate (132) to form a side wall of the filter installation space (131). The upper inside region of the base side wall (135) is open to form an opening (137) through which the filter installation space (131) communicates with the outside. A worker can access the filter installation space (131) through the opening (137) to install or remove the filter module (150). In addition, the opening (137) can be appropriately sealed during the process of coupling the adsorption reaction apparatus (190) to the apparatus for collecting powder (110).

The expansion unit (140) is formed by expanding to a shape in which part of a side of the filter installation section (130) protrudes sideways. The expansion unit (140) forms an expansion space (141) which communicates with the filter installation space (131) internally. The expansion space (141) is formed by partially expanding in the radial direction with respect to the central axis (X) from the circular filter installation space (131). The expansion space (141) forms the internal space of the housing (120) together with the filter installation space (131). The expansion unit (140) includes an expansion floor plate (142), an expansion top plate (145) located above and apart from the expansion floor plate, and an expansion side wall (147) connecting the expansion floor plate (142) and expansion top plate (145). The usage time of an apparatus for collecting powder (110) can be extended by the increase of powder collection capacity due to the expansion space (141) formed by the expansion unit (140).

The expansion floor plate (142) is disposed to be flat and is joined to the base floor plate (132) of the filter installation unit (130). The expansion floor plate (142) is preferably formed integrally with the base floor plate (132). The expansion floor plate (142) is a shape expanded outward from a semicircular arc of the round base floor plate (132). The upper surface of the expansion floor plate (142) forms the floor of the expansion space (141). The upper surface of the base floor plate (132) and upper surface of the expansion floor plate (142) are connected so as to be flat, thereby forming the floor of the entire internal space of the housing (120).

The expansion top plate (145) is located so that it is above, apart from, and facing the expansion floor plate (142) and is generally the same shape as the expansion floor (142). The expansion top plate (145) is a shape that is flat and expands outward from the base side wall (135). The lower surface of the expansion top plate (145) forms the ceiling of the expansion space (141). An installation port (146) on which a filter striking module (160) is installed is formed on the expansion top plate (145).

An expansion side wall (147) is a vertically upright wall which forms a side wall of the expansion space (141). The bottom of the expansion wall (147) is connected to the edge of [[the expansion floor plate (142),]] a connecting side wall unit, the top of the expansion side wall (147) connects with the edge of the expansion top plate (145), and both ends in the expansion circumferential direction connect with the base side wall (135). The expansion side wall (147) includes a first extension wall unit (148*a*) and a second extension wall unit (148*b*), and the connecting side wall unit (148*c*) connecting the two extension walls (148*a* and 148*b*).

The first extension wall unit (148*a*) is formed by extending from the base side wall (135) and extends in a straight line along the circumferential direction of the expansion side wall (147). One circumferential direction end of the first side wall unit (148*a*) forms a tangential plane and connects with the base side wall (135), and the other circumferential direction end connects with the connecting side wall unit (148*c*). The internal surface of the first extension wall unit (148*a*) links as it forms a tangential plane with the internal wall surface of the expansion side wall (147) also.

The second extension wall unit (148*b*) is disposed such that it faces and is parallel with the first extension wall unit (148*a*). The second extension wall unit (148*b*) is formed by extending from the base side wall (135) and extends in a straight line along the circumferential direction of the expansion side wall (147). One circumferential direction end forms a tangential plane and connects with the base side wall (135), and the other circumferential direction end connects with the connecting side wall unit (148*c*). The internal wall surface of the second extension wall unit (148*b*) forms a tangential plane and connects with the internal wall surface of the expansion side wall (147) also.

The connecting side wall unit (148*c*) extends in the shape of curve that is convex with respect to the filter installation unit (130) along the circumferential direction of the expansion side wall (147). The two circumferential direction ends of the connecting side wall unit (148*c*) form a tangential plane and connect with the first extension wall unit (148a) and the second extension wall unit (148b), respectively.

The present embodiment is described a form in which the connecting side wall unit (148c) extends in a semicircular arc along the circumferential direction of the expansion side wall (147). The internal wall surface of the first extension wall unit (148a) and the internal wall surface of the second extension wall unit (148b) form a tangential plan and connect with the internal wall surface of the connecting side wall unit (148c).

Figures 4, 5:
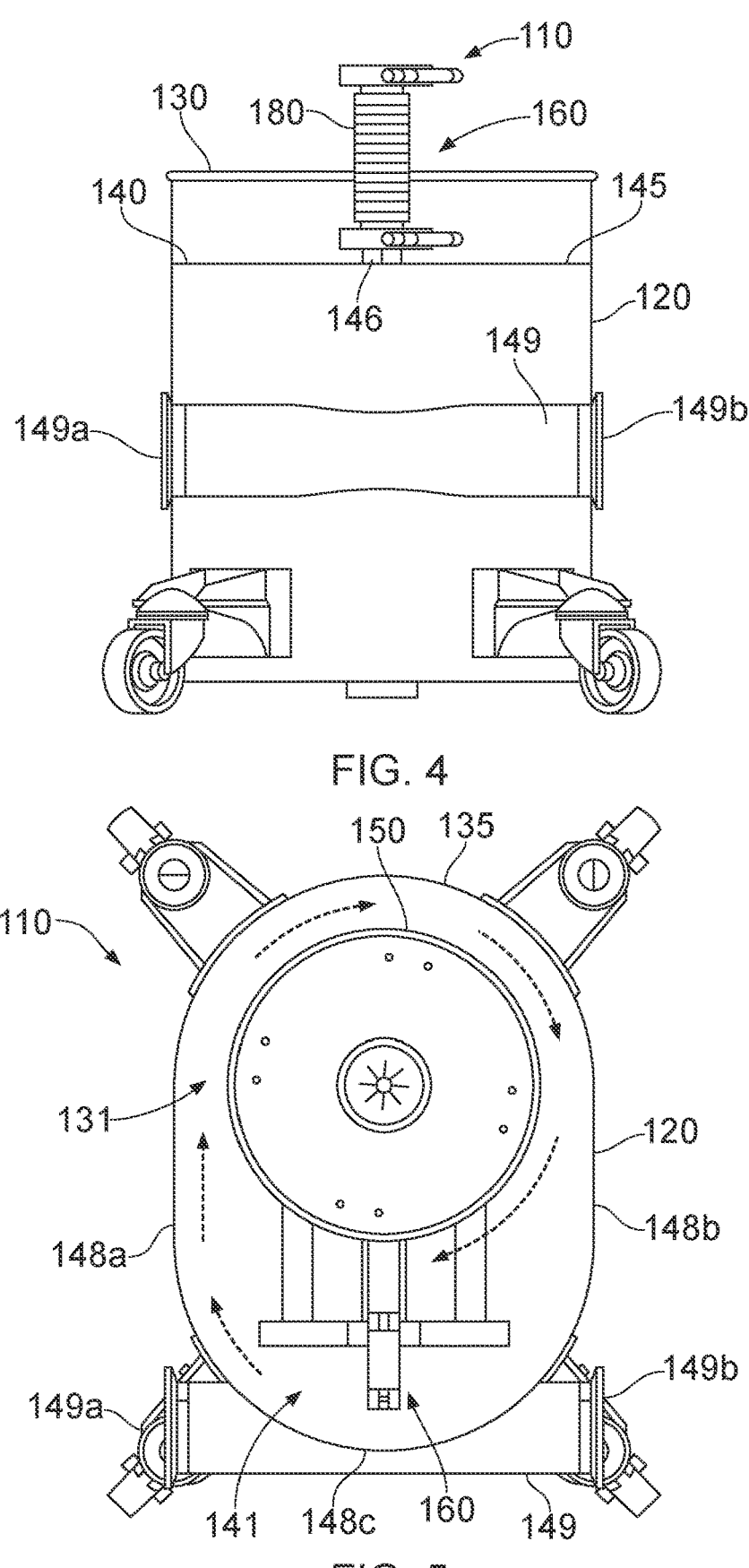
FIG. 4 depicts a front view of the apparatus for collecting powder depicted in FIG. 1.
FIG. 5 depicts a plan view depicting the apparatus for collecting powder depicted in FIG. 1 having the housing cut along the A-A' line in FIG. 2 so as to reveal the interior.

A gas suction pipe (149) which communicates with the internal space of the housing (120) is coupled to the connecting side wall unit (148c). Exhaust gas to be treated is drawn into the internal space of the housing (120) through the gas suction pipe (149). The gas suction pipe extends in a straight line along the horizontal direction and is disposed such that it extends along the tangential direction of the connecting side wall (148c). The gas suction pipe (149) connects with the furthest point from the filter installation unit (130) in the connecting wall unit (148c) and extends along both sides of the connecting side wall unit (148c). Both ends of the gas suction pipe (149) are open to form a first and second suction port (149a and 149b) at each end of the gas suction pipe (149), respectively. The one of the first gas suction port (149a) and second gas suction port (149b) which can reduce the length of the gas supply segment is selected to be used as a gas suction port, and a pressure gauge, safety valve, etc. can be installed on the remaining one to ensure safety of processes and operation. Gas flow inside the housing (120) when the second gas suction port (149b) of the two gas suction ports (149a and 149b) is selected is shown with dashed arrows in FIG. 5. Referring to FIG. 5, exhaust which has flowed through the second gas suction port (149b) into the internal space of the housing (120) flows uniformly around the filter module (150) along the first extension wall (148a) of the connecting side wall unit (148c) and the base side wall (135). As the exhaust gas flows in the internal space of the housing (120), relatively heavy substances within the powder contained in the exhaust gas fall due to gravity and accumulate in the internal space of the housing (120).

A plurality of wheels (129) is installed in the housing (120) to facilitate movement of the exhaust gas treatment equipment (100).

The filter module (150) is installed in the filter installation space (131) of the housing (120). The filter module (150) includes a filter body (151), which includes a filter), and a plurality of support legs (158), which support the filter body (151).

The filter body (151) filters the exhaust gas which has flowed into the internal space of the housing (120) and feeds it to the adsorption reaction apparatus (190). The filter body (151) is generally in the form of an upright cylinder and is disposed coaxially with the cylindrical filter installation space (131). The filter body (151) includes a bottom plate member (152), a top plate member (153), and a filter member (154). The filter body (151) is located apart from the floor of the filter installation space (131).

The bottom plate member (152) is disposed horizontally in the shape of a flat circular plate.

The top plate member (153) is disposed horizontally above and apart from the bottom plate member (152) in the shape of a flat circular plate. A discharge port (153a), by which filtered exhaust gas is discharged, is formed in the centre of the top plate member (153). A discharge port (153a) is located on the central axis (X). The filter body (151) and adsorption reaction apparatus (190) communicate through the discharge port (153a).

The filter member (154) is disposed between the bottom plate member (152) and top plate member (153) and filters exhaust gas flowing into the inside. Although not depicted, the filter member (154) can be configured such that a plurality is installed along the radial direction and consecutive filtering occurs as it goes toward the centre. Powder adhered to the surface of the filter member (154) can be removed by being knocked off by the filter striking module (160).

Each of the plurality of support legs (158) extends downward from the filter body (151) to separate the filter body (151) from the floor of the filter installation space (131).

Figure 6:
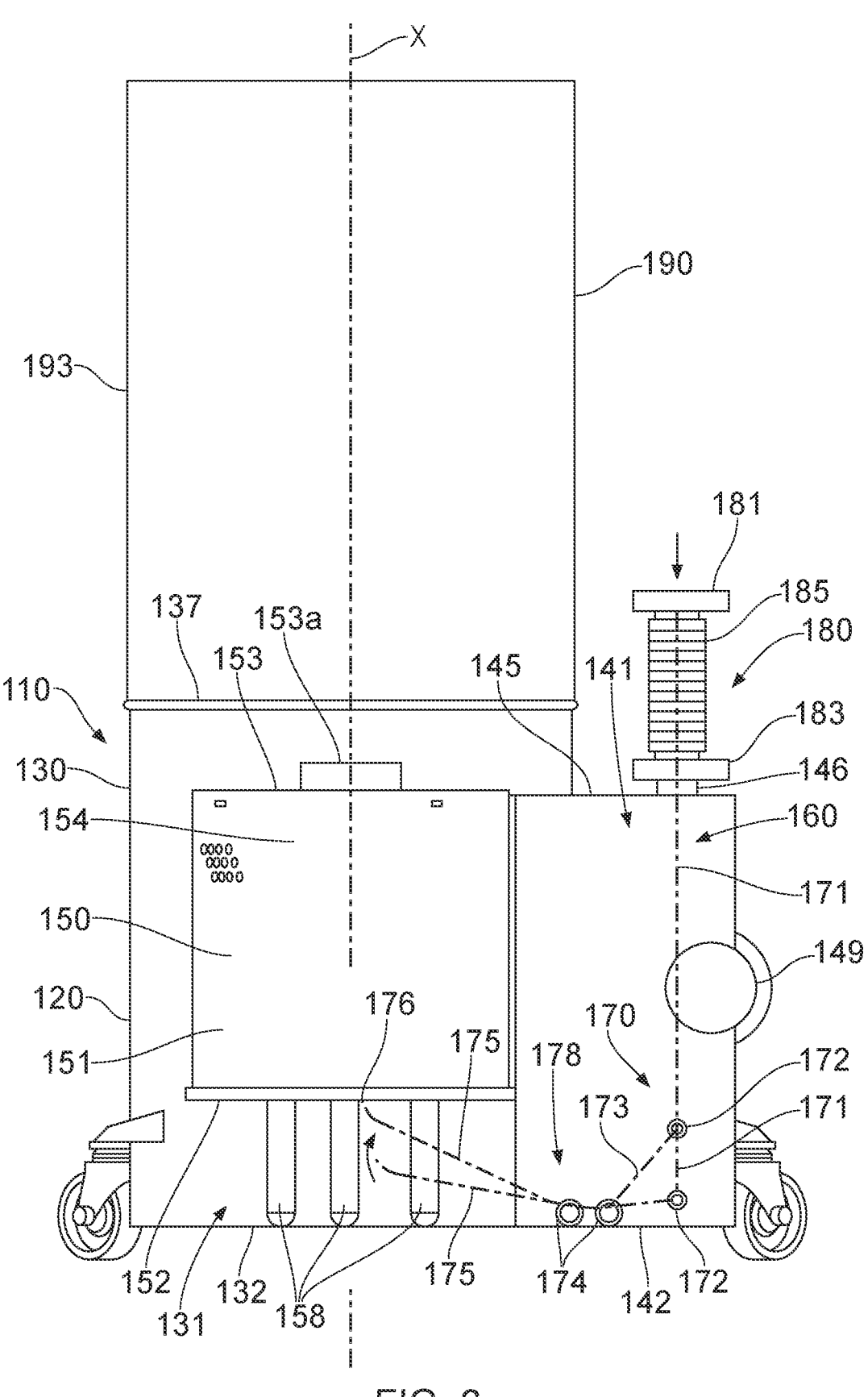
FIG. 6 depicts a lateral view depicting the apparatus for collecting powder depicted in FIG. 1 having the housing cut along the B-B' line in FIG. 3 so as to reveal the interior.
Figure 7:
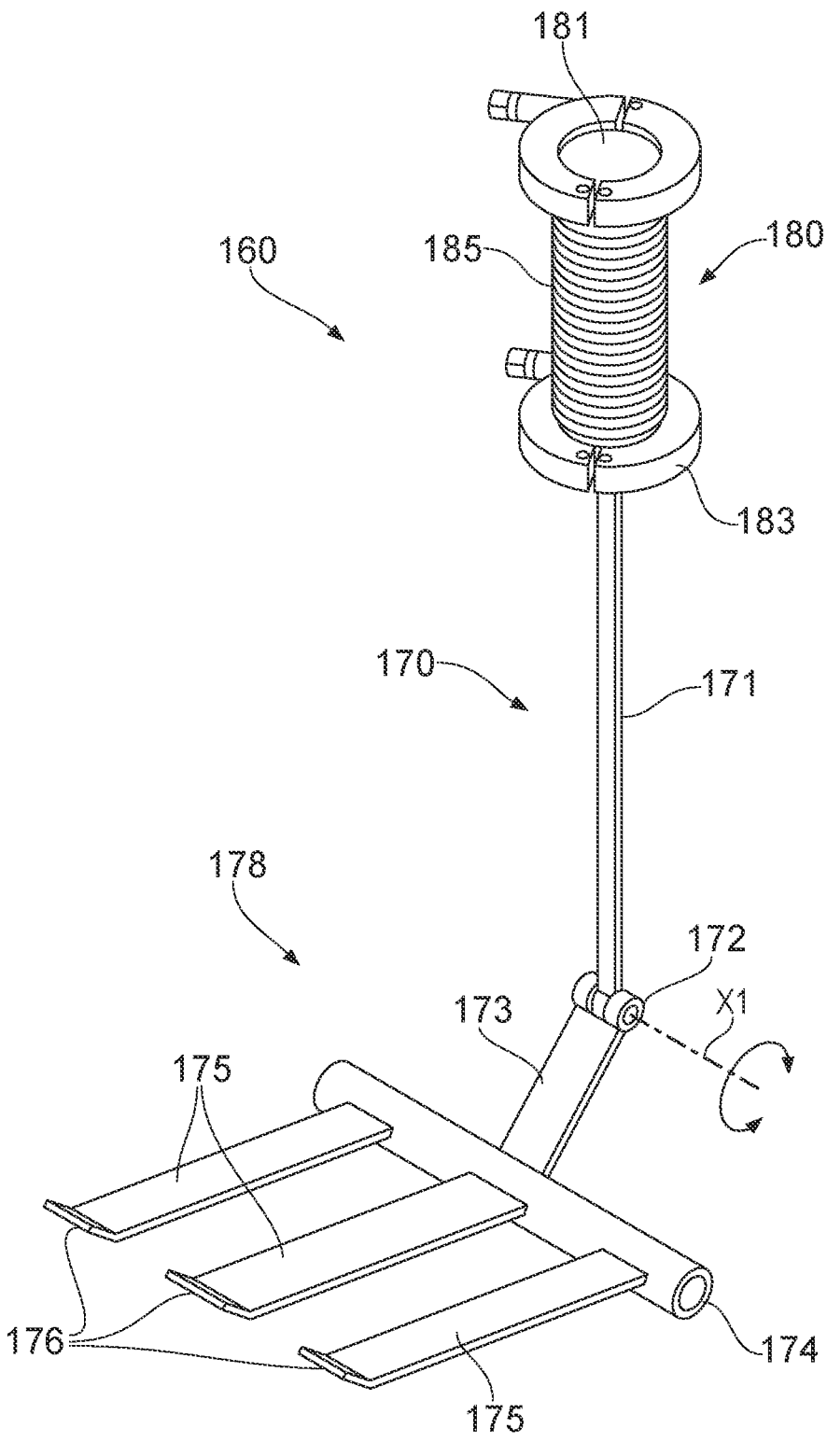
FIG. 7 depicts a perspective view depicting the filter striking module depicted in FIG. 6.

The filter striking module (160) performs a dust removal function on the filter by applying a physical impact to the filter body (151) to brush away and remove powder adhered to the surface of the filter member (154). FIG. 7 depicts the filter module (160) as a perspective view. Referring to FIG. 1 to FIG. 7, the filter module (160) includes the operating unit (180) and a link structure (170) connecting to the operating unit (180).

The operating unit (180) is installed on the outside of the housing (120) for operation by an operator. Specifically, the operating unit (180) is installed on an installation port (146) that is formed on the expansion top plate (145) of the housing (120). The operating unit (180) includes a pressure plate (181), a port coupler (183), and a flexible tube (185) coupled between the pressure plate (181) and port coupler (183).

The pressure plate (181) is located above and apart from the installation port (146). The flexible tube (185) and link structure (170) connect to the pressure plate (181). An operator can operate the link structure (170) by pressing down and moving the pressure plate (181).

The port coupler (183) is located below and apart from the pressure plate (181) and is coupled to the installation port (146) formed on the expansion top plate (145) in a sealed state. The elastic tube (185) is coupled to the port coupler (183).

The flexible tube (185) is disposed such that it extends vertically between the pressure plate (181) and port coupler (183), which are located vertically apart. The upper end of the flexible tube (185) is connected to the pressure plate (181) and the lower end of the flexible tube (185) is connected to the port coupler (183). The flexible tube (185) provides an elastic force in the direction in which the pressure plate (181) and the port coupler (183) become distant from each other. External force on the pressure plate (181) causes it to move downward from its initial position then the elastic force of the flexible tube (185) causes it to return to its original position when the external force is removed. The present embodiment is described with the use of conventional bellows for the flexible tube (185). The internal space of the flexible tube (185) communicates with internal space of the housing (120) through the installation port (146) formed on the expansion top plate (145), and the internal space of the elastic tube (185) is sealed from the outside.

The link structure (170) includes a lever unit (178) and a connecting rod (171) that connects the lever unit (178) and the pressure plate (181).

The lever unit (178) is located in the internal space of the housing (120). The lever unit (178) includes a support (174), a first extension rod (173) that extends from the support (174), and a plurality of second extension rods (175) that extend from the support (174). The support (174), first extension rod (173), and plurality of second extension rods (175) are integrally formed.

The support (174) contacts the floor in the internal space of the housing (120) and is located between the filter body (151) and the installation port (146). The support (174) is a rod in the shape of a circular pipe and is disposed to extend horizontally along the width direction of the filter body (151).

The first extension rod (173) is formed by extending from the support (174) toward the installation port (146). The end of the first extension rod (173) is coupled such that the connecting rod (171) and the first hinge (172) cause it to be able it to rotate around the rotational axis (X1). The first rotational axis (X1) is a straight line extending in parallel with the extension direction of the support (174). In a state in which the pressure plate (181) of the operating unit (180) has been placed in its initial position, the first extension rod (173) extends obliquely such that it goes upward as it goes from the support (174) toward the installation port (146). This is for the purpose of securing a sufficient distance so that an end of the first extension rod (173) can move downward.

The plurality of second extension rods (175) is formed by extending from the support (174) toward the filter body (151) on the opposite side of the first extension rod (173). The plurality of second extension rods (175) is disposed side by side in turn along the width direction of the filter body (151) in a state of being apart from each other. The present embodiment is described with three second extension rods (175); however, the present invention is not limited thereto. For example, there could be one, two, four, or more second connecting rods (175), and these would also be within the scope of the present invention. Each end of the plurality of second extension rods (175) is located underneath the filter body (151). Each of the of second extension rods (175) the plurality forms an angle smaller than 180 degrees with the first extension rod (173). A striking unit (176) bent and extending upward at the end of each of the second extension rods (175) of the plurality is formed. The end of the striking unit (176) moves upward to strike the bottom of the filter body (151).

The adsorption reaction apparatus (190) treats exhaust gas discharged from the apparatus for collecting powder (110)) using an adsorption reaction. The adsorption reaction apparatus (190) is coupled to the top of the apparatus for collecting powder (110) such that it closes the opening (137) formed in the housing (120) of the powder collection apparatus (110). Although not depicted, an adsorption layer is formed of an adsorbent which absorbs the gas constituent to be treated in the exhaust gas inside the adsorption reaction apparatus (190), and the adsorption layer communicates with the discharge port (153a) of the apparatus for collecting powder (110). The adsorption reaction apparatus (190) could be furnished with a plurality of adsorption layers formed of adsorbents of different types such that a plurality of gas constituents is treated. The adsorption reaction apparatus (190) is generally cylindrical and disposed coaxially with the filter body (151) in a upright form. The side wall (193) of the adsorption reaction apparatus (190) is formed along the vertical direction with the base side wall (135) of the housing (130) to form a single cylinder shape.

Hereinafter, the operation of the filter striking module (160) will be described in detail with reference to FIG. 6. Referring to FIG. 6, in a state where external force is not being applied to the operating unit (180) by a worker, the striking unit (176) of the link structure (170), as depicted with solid lines, is located in a state of being below and apart from the filter body (151). This state is referred to as the normal state of the filter striking module (160) in the present embodiment. When a worker presses the pressure plate (181) of the operating unit (180) in the normal state and causes it to move downward, the connecting rod (171) coupled to the pressure plate (181) descends downward. The angle between the connecting rod (171) and first extension rod (173) decreases as the end of the first extension rod (173) of the lever unit (178) coupled by the first hinge (171) to the end of the connecting rod (171) also descends downward with the downward descent of the connecting rod (171). The end of the second extension rod (175) moves toward the bottom of the filter body (151) as the support (174) moves slightly toward the filter body (151) with the downward descent of the end of the first extension rod (173). The end of the second extension rod (175) moves upward to cause the striking unit (176) formed at the end of the second extension rod (175) to strike the bottom of the filter body (151). This state is referred to as the striking state of the filter striking module (160) in the present embodiment. The striking unit (176) is caused to strike the bottom of the filter body (151), and, thus, the state of coupling between the adsorption reaction apparatus (190) and filter body (151), which are disposed vertically on the coaxial line, can be maintained stably. The striking of the striking unit (176) causes the powder adhered to the surface of the filter member (154) to drop and accumulate on the floor of the housing (120). When the external force applied to the operating unit (180) is removed, the elasticity of the flexible tube (185) causes the pressure plate (181) to return to its original position, and the filter striking module (160) automatically returns to the normal state.

Although the present embodiment was described above with the filter striking module (160) being operated manually by a worker, it could also be configured unlike this such that it is operated automatically by adding a mechanical apparatus such as a pressure piston to the installation port (146), and this would also be within the scope of the present invention.

Figure 8:
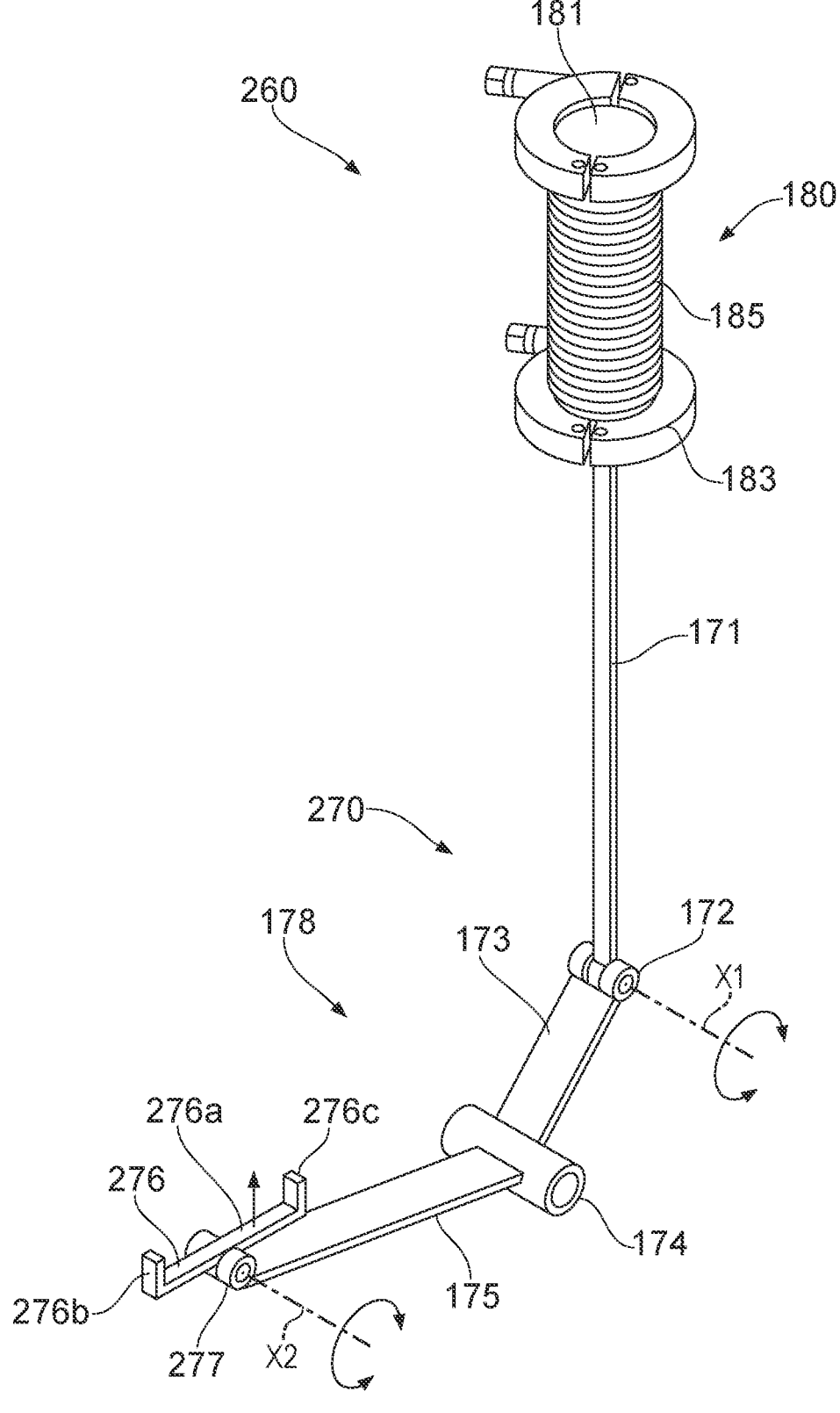
FIG. 8 depicts a perspective view depicting another embodiment of the filter striking module depicted in FIG. 6.

FIG. 8 depicts a filter striking module according to another embodiment of the present invention as a perspective view. Referring to FIG. 8, the filter striking module (260) includes an operating unit (180) and a link structure (270) connecting with the operating unit (180).

The operating unit (180) includes a pressure plate (181), a port coupler (183), and a flexible tube (185) coupled between the pressure plate (181) and the port coupler (183), and a detailed description is omitted because it is configured the same as the operating unit (180) depicted in FIG. 7.

The link structure (270) includes a lever unit (278), a connecting rod (171) connecting the lever unit (278) and a pressure plate (181), and a striking member (276) coupled to the lever unit (278).

The lever unit (178) includes a support (174), a first extension rod (173) extending from the support (174), and a second extension rod (175) extending from the support (174). Because the lever unit (178) is generally of the same configuration as the lever unit (178) depicted in FIG. 7 except that only one second extension rod (175) is furnished in the lever unit (178), a detailed description thereof is omitted. The present embodiment is described with only one second connecting rod (175); however, there could be a plurality as depicted in FIG. 7, and this would also be within the scope of the present invention.

The striking member (276) is coupled to the end of the second extension rod (175) such that the second hinge (277)

allows it to rotate around the. second rotational axis (X2) The second rotational axis (X2) is a straight line extending in parallel with the extension direction of the support (174). The striking member (276) includes striking rod (276a) which extends in both directions along the radial direction of the second rotational axis (X2) with the second hinge (277) in between and is located above the second extension rod (175). A first striking unit (276b) and second striking unit (276c) protruding upward are formed at both ends of the striking rod (276a). With the operation of the operating unit (180) causing the rise of the ends of the second extension rod (175), one of the first striking unit (276b) and second striking unit (276c) strike the filter body (151 of FIG. 6, then the other strikes the filter body (151) consecutively. In the embodiment depicted in FIG. 8, it would be preferable to limit the range of rotation of the second hinge (277) such that the two striking units (276b and 276c) are always oriented upward.

Because the connecting rod (171) is generally the same as the configuration of the connecting rod (171) depicted in FIG. 7, a detailed description is omitted.

Figure 9:
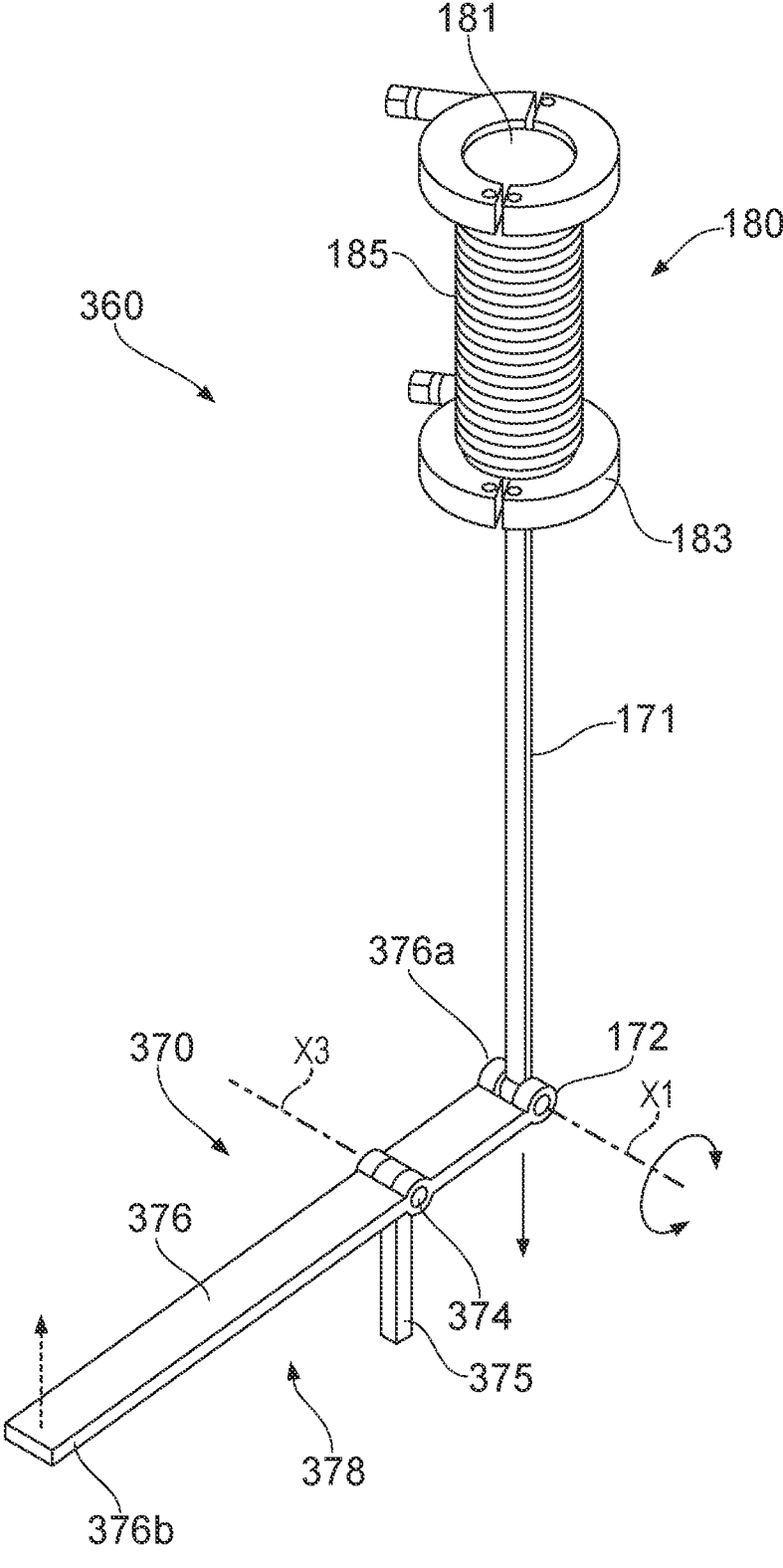
FIG. 9 depicts a perspective view depicting another embodiment of the filter striking module depicted in FIG. 6.

FIG. 9 depicts with a perspective view a filter striking module according to another embodiment of the present invention. Referring to FIG. 9, the filter striking module (360) includes an operating unit (180) and a link structure (370) connecting with the operating unit (180).

The operating unit (180) includes a pressure plate (181), a port coupler (183), and a flexible tube (185) coupled between the pressure plate (181) and port coupler (183), and, because it the same configuration as the operating unit (180) depicted in FIG. 7, a detailed description thereof is omitted.

The link structure (370) includes a lever unit (378) and a connecting rod (171) connecting the lever unit (378) and pressure plate (181).

The lever unit (378) includes a support leg (375) and a lever (376) coupled to the support leg (375) such that it can rotate.

The support leg (375) is a rod shape extending vertically and extending upward from the floor of the internal space of the housing (120), and it is located between the filter body (151) and installation port (146). A lever (376) is coupled to the top of the support leg (375) such that a third hinge (374) allows it to rotate around a third rotational axis (X3). The third rotational axis (X3) is a straight line extending along the width direction of the filter body (151).

The lever (376) is a long-extending rod shape and is coupled to the top of the support leg (375) at one point between both ends in the length direction of the lever (376) such that the third hinge (374) allows it to rotate. One end (376a) of the lever (376) is coupled with the connecting rod (171) such that the first hinge (172) allows it to rotate, and the other end (376b) of the lever (376) is located below the filter body (151 of FIG. 6).

Operation of the operating unit (180) causes the other end (376b) of the lever to rise and strike the filter body (151 of FIG. 6).

Because the connecting rod (171) is generally the same as the configuration of the connecting rod (171) depicted in FIG. 7, a detailed description thereof is omitted.

The striking member (276) of the embodiment depicted in FIG. 8 could be hingedly coupled to the end of the lever (376) and used, and this would also be within the scope of the present invention.

Although the present invention has been described through the above embodiments, the present invention is not limited thereto. The above embodiments may be modified or changed without departing from the spirit and scope of the present invention, and those skilled in the art will recognise that such modifications or changes belong to the present invention.

Although elements have been shown or described as separate embodiments above, portions of each embodiment may be combined with all or part of other embodiments described above.

Although the subject matter has been described in language specific to structural features and/or methodological acts, it is to be understood that the subject matter defined in the appended claims is not necessarily limited to the specific features or acts described above. Rather, the specific features and acts described above are described as example forms of implementing the claims.

The invention claimed is:

1. An apparatus for collecting powder contained in an exhaust gas before the exhaust gas is introduced into an adsorption reaction device which treats the exhaust gas using an adsorption reaction, wherein
   the apparatus for collecting powder in exhaust gas comprises a filter body, which includes a filter member which filters the exhaust gas and feeds the exhaust gas to the adsorption reaction device and is disposed below the adsorption reaction device; and
   a housing which provides an internal space for storing powder separated from the filter member and is installed below the adsorption reaction device; and
   which is a space projected below the adsorption reaction device and which includes a filter installation unit which provides a space internally for installing the filter body, and an expansion unit which is formed so as to protrude sideways from the filter installation unit and provides an expansion space which communicates internally with the filter installation space, and
   the internal space is expanded by the expansion space so as to increase the powder collection capacity,
   and a gas suction port which sucks in the exhaust gas is installed in the expansion unit.

2. The apparatus for collecting powder in exhaust gas of claim 1, wherein the filter installation space is an erect cylinder, and the filter body is located on a central axis of the filter installation space.

3. The apparatus for collecting powder in exhaust gas of claim 2, wherein the filter body is cylindrical and is disposed coaxially with the filter installation space.

4. The apparatus for collecting powder in exhaust gas of claim 1, wherein the expansion unit includes an expansion floor plate, an expansion top plate located above and spaced apart from the expansion floor plate, and an expansion side wall connected to the expansion top plate and the expansion floor plate.

5. The apparatus for collecting powder in exhaust gas of claim 4, wherein the expansion side wall includes a first extension wall unit which forms and extends a plane tangential to a side wall of the filter installation unit along a circumferential direction, a second extension wall unit which forms and extends a plane tangential to the filter installation unit along a circumferential direction and faces the first extension wall unit, and a connecting wall unit, which extends in the shape of a convex curve with respect to the filter installation unit and extends the first extension wall unit and the second extension wall unit.

6. The apparatus for collecting powder in exhaust gas of claim 5, wherein the connecting side wall unit extends in an arc along a circumferential direction of the expansion side wall.

7. The apparatus for collecting powder in exhaust gas of claim 5, wherein the first extension wall unit and the second extension wall unit each form and extend a surface tangential to the connecting side wall unit.

8. The apparatus for collecting powder in exhaust gas of claim 5, further including a gas suction pipe having a gas suction port formed therein so as to introduce the exhaust gas into the internal space, and which is coupled to the the connecting side wall unit.

9. The apparatus for collecting powder in exhaust gas of claim 8, wherein the gas suction pipe is disposed so as to extend along a direction tangential to the connecting side wall unit horizontally, and the exhaust gas introduced via the gas suction pipe flows sequentially along the connecting side wall unit, one of the two extension wall units, and a side wall of the filter installation unit.

10. The apparatus for collecting powder in exhaust gas of claim 8, wherein the gas suction pipe is formed by extending both sides from the point where it is coupled to the connecting side wall unit, and the gas suction ports are formed on both ends of the gas suction pipe respectively.

11. The apparatus for collecting powder in exhaust gas of claim 10, wherein one of the two gas suction ports is selectively closed, and the exhaust gas flows into the internal space by only one gas suction port.

12. The apparatus for collecting powder in exhaust gas of claim 1, further comprising a filter striking module, which applies a physical impact to the filter body so as to dislodge powder adhering to the external surface of the filter member.

13. The apparatus for collecting powder in exhaust gas of claim 12, wherein the filter striking module includes an operating unit which is coupled to the installation port formed in the expansion unit, and a link structure which is operated by the operating unit so as to strike the filter body in the internal space of the housing.

14. The apparatus for collecting powder in exhaust gas of claim 13, wherein the link structure includes a lever unit located in the internal space and a connecting rod which connects the lever unit and operating unit, wherein the lever unit includes a support which makes contact with the floor of the internal space, a first extension rod which extends from the support is hingedly coupled to the connecting rod, and a second connecting rod which extends from the support to the opposite side of the first extension rod;

the end of the second extension rod is located below the filter body; and the operation of the operating unit causes an end of the first extension rod to descend downward and an end of the second extension rod to rise upward with respect to the support and strike underneath the filter body.

15. The apparatus for collecting powder in exhaust gas according of claim 14, wherein the link structure further includes a striking element which is hingedly coupled to an end of the second extension rod, wherein a plurality of striking units spaced apart from each other by the hinge are formed in a radial direction of the rotational axis on the striking element.

16. The apparatus for collecting powder in exhaust gas according of claim 13, wherein the link structure includes a lever unit located in the internal space and a connecting rod which connects the lever unit and the operating unit, and the lever unit includes a support leg and a lever rotatably coupled to the support leg, wherein one end of the lever is hingedly coupled to the connecting rod, and the other end of the lever is located below the filter body, and the operation of the operating unit causes one end of the lever to descend downward and the other end of the lever to rise upward and strike underneath the filter body.

17. An exhaust gas treatment equipment comprising: an adsorption reaction device for treating exhaust gas using an adsorption reaction; and a device for collecting powder in exhaust gas that collects powder contained in exhaust gas before the exhaust gas flows into an adsorption reaction device;

wherein the device for collecting powder in exhaust gas includes a filter body, which includes a filter member that filters and feeds the exhaust gas to the adsorption reaction device, and which is disposed below the adsorption reaction device, and includes a housing which provides a filter installation space internally for storing the powder separated from the filter member, which housing is a space projected below the adsorption reaction device, and which includes a filter installation unit which internally provides a filter installation space where the filter is installed, and an expansion unit which is formed so as to protrude sideways from the filter installation unit and provides an expansion space which communicates internally with the filter installation space, and the internal space is expanded by the expansion space so as to increase the powder collection capacity, and a suction port for sucking in the exhaust gas is installed in the expansion unit.

* * * * *